(12) United States Patent
Dunn

(10) Patent No.: US 9,630,607 B2
(45) Date of Patent: Apr. 25, 2017

(54) INLINE CHEMICAL INDUCTION SYSTEM

(71) Applicant: Tim Dunn, Three Rivers, MI (US)

(72) Inventor: Tim Dunn, Three Rivers, MI (US)

( * ) Notice: Subject to any disclaimer, the term of this patent is extended or adjusted under 35 U.S.C. 154(b) by 153 days.

(21) Appl. No.: 14/716,316

(22) Filed: May 19, 2015

(65) Prior Publication Data

US 2016/0016573 A1 Jan. 21, 2016

Related U.S. Application Data

(60) Provisional application No. 62/026,104, filed on Jul. 18, 2014.

(51) Int. Cl.
*B01D 53/02* (2006.01)
*B60T 17/00* (2006.01)
*B01D 53/26* (2006.01)
*B01D 53/04* (2006.01)

(52) U.S. Cl.
CPC .......... *B60T 17/004* (2013.01); *B01D 53/261* (2013.01); *B01D 53/0407* (2013.01)

(58) Field of Classification Search
CPC .. B01D 53/0407; B01D 53/261; B60T 17/004
See application file for complete search history.

(56) References Cited

U.S. PATENT DOCUMENTS

| | | | |
|---|---|---|---|
| 4,261,715 A | 4/1981 | Frantz | |
| 4,336,042 A | 6/1982 | Frantz et al. | |
| 4,707,166 A | 11/1987 | Khosropour | |
| 5,427,609 A | 6/1995 | Zoglman et al. | |
| 2004/0040273 A1* | 3/2004 | Lewin | B01D 45/12 55/447 |
| 2014/0020776 A1 | 1/2014 | Allen et al. | |

* cited by examiner

*Primary Examiner* — Christopher P Jones
(74) *Attorney, Agent, or Firm* — Global Intellectual Property Agency, LLC; Daniel Boudwin

(57) ABSTRACT

An air dryer system to keep brakes free from ice and water. The air dryer system includes a canister having a side wall and a bottom defining an upwardly opening chamber. A lid may be removably secured to the canister for an air tight closure of the chamber. A ball valve is coupled to the bottom of the canister. A t-connector is coupled to the canister via the ball valve. The ball valve places the t-connector in fluid communication with the chamber. A quick release coupling may be attached to the ball valve. A plurality of glad hand connectors are disposed at distal ends of the t-connector allowing the air dryer system to be easily assembled to a truck and truck trailer.

8 Claims, 3 Drawing Sheets

INLINE CHEMICAL INDUCTION SYSTEM

CROSS REFERENCE TO RELATED APPLICATION

This application claims the benefit of U.S. Provisional Application No. 62/026,104 filed on Jul. 18, 2014 entitled "Inline Chemical Induction System." The above identified patent application is herein incorporated by reference in its entirety to provide continuity of disclosure.

FIELD OF THE INVENTION

The invention generally relates to air braking systems for trucks. More particularly, the present invention relates to removing moisture from air braking systems to ensure that air brakes operate as intended and help decrease the occurrence of excessive alcohol waste.

BACKGROUND OF THE INVENTION

In a conventional air braking system, air is supplied under pressure from a compressor through an air dryer and non-return valve to a reservoir, from which air is drawn via a demand valve. The air dryer typically consists of a container of desiccant, and is periodically regenerated by passing a small volume of dry air through the desiccant in reverse, and allowing this volume to exhaust to atmosphere.

Compressed air systems are widely used to operate a number of devices, and find particular use in braking systems for heavy vehicles. These systems include an air compressor which compresses ambient air and charges a storage reservoir. The compressor is engine operated and a governor or controller, responsive to the reservoir pressure, selectively enables or disables the compressor as needed. Air dryers commonly employ a drying material or desiccant through which air passes to remove moisture and limit problems associated with moisture entering brake system components. Moisture is adsorbed by the desiccant and removed from the compressed air before it is transported to the storage reservoir.

In these known systems, periodic or cyclic purging of the air dryers is required in order to purge or regenerate the desiccant. A typical air brake drying system in present day trucks functions as follows: Ambient air is drawn in through the engine air filter, which removes particulate contaminants. The air then enters the suction side of a turbocharger or super charger, which boosts the pressure to about 103 kPa (15 psig). An intercooler is used to cool the air. Most of the boosted air then enters the engine intake, but a portion of it (typically 12 SCFM, but varying according to the engine speed) flows to the air compressor. The compressor increases the pressure from about 103 kPa (15 psig) to the system pressure of about 793 to 896 kPa (115 to 130 psig). The compressed air leaving the compressor has been heated by the compression process and as a result is capable of holding a relatively large amount of water. As the air cools in the system, it loses its capability to retain as much moisture, which results in the formation of liquid water in the system. This moisture and other contaminants can be detrimental to the system in that freezing or sludge buildup can occur. Excessive moisture can also wash away needed lubricants in the valves and other air system components.

Most commercial trucks, tractors and buses use some form of air dryer to remove the unwanted moisture and contaminants from the air brake system. The most common air dryers in use today are of the desiccant variety. In a desiccant air dryer, some water condenses before it reaches the desiccant and remaining water molecules are adsorbed by the desiccant material within the air dryer. The moisture is retained by the desiccant material until a quantity of dry expanded air is flowed over the desiccant to regenerate the desiccant. If there is too long a period before regeneration occurs, then the desiccant will become saturated and the air dryer effectively stops functioning. The type of air dryer employed is a pressure swing dryer. After being dried in the pressure swing dryer, the compressed air flows to a supply tank and system reservoirs.

As is well known to those skilled in the art, the removal of moisture condensate from a compressed air system is not only vital to the efficiency of the system, but is also necessary in order to prevent such condensate from reaching any of the mechanisms or devices to which the compressed air is supplied. The presence of such condensate may cause damage or inefficient performance.

SUMMARY OF THE INVENTION

In view of the foregoing disadvantages inherent in the known types of air brake systems now present in the prior art, the present invention provides an air brake system wherein moisture and contaminants are efficiently removed from the reservoir.

It is therefore an object of the present invention to provide a new and improved air brake system that has all of the advantages of the prior art and none of the disadvantages.

According to one embodiment of the present invention, the air dryer system includes a canister, a lid, a ball valve, a t-connector, a quick release coupling attached to the ball valve, and a plurality of glad hands. The canister may include a side wall and a bottom defining an upwardly opening chamber. The lid may be removably secured to the canister for an air tight closure of the chamber. The ball valve may be coupled to the bottom of the canister. The ball valve is moveable between an open position and a closed position. The t-connector is coupled to the canister via the ball valve. The ball valve places the t-connector in fluid communication with the chamber. The quick release coupling is pivotally attached to the ball valve. The plurality of glad hand connectors are disposed at distal ends of the t-connector.

Another object of the present invention is to provide an air dryer system further including at least two lengths of piping. The lengths of piping are coupled to distal ends of the t-connector. The piping from the t-connector may be positioned at a forty five degree angle.

It is another object of the present invention is to provide a canister that has a volume of about 30 ounces.

It is yet another object of the present invention to provide an air dryer system with glad hand connectors located at an outward end of the piping.

Another object of the present invention is to provide an air dryer system with brass pipes and fittings removably attaching the air dryer system to a truck and a truck trailer.

It is yet another object of the present invention to provide an air dryer system further including a pipe sealant. The pipe sealant provides a seal for the glad hand connectors connecting the air dryer system to a truck and truck trailer.

In yet another object of the present invention, alcohol is poured into the top of the canister. A user can pour alcohol into the top canister of the device and proceed to open the ball valve, wherein the ball valve can be connected to the piping of the present invention. This enables the alcohol to flow through the piping and brakes, thus clearing the vehicle's system of moisture.

Another object of the present invention is to provide an air dryer system further including brass pipes and fittings to removably attach the air dryer system to a truck and truck trailer.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
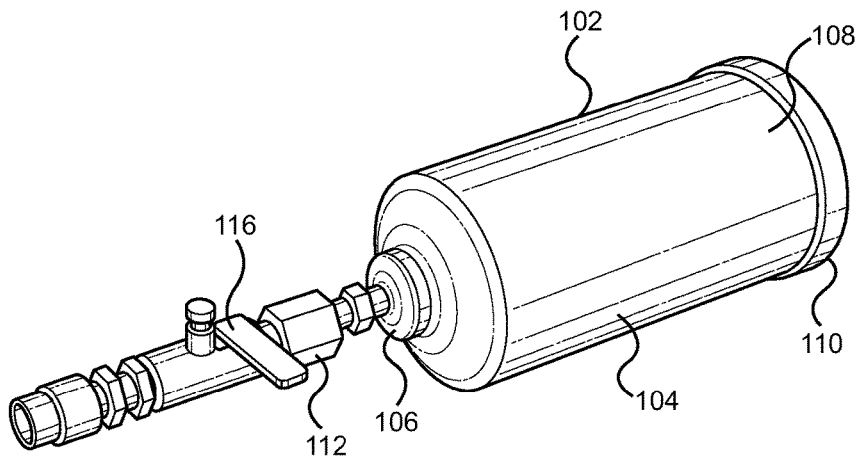
FIG. 1 shows perspective view of the canister according to one embodiment of the present invention.

Reference is made herein to the attached drawings. Like reference numerals are used throughout the drawings to depict like or similar elements of the air dryer system. For the purposes of presenting a brief and clear description of the present invention, the preferred embodiment will be discussed as used for trucks and trailers. The figures are intended for representative purposes only and should not be considered to be limiting in any respect.

One embodiment of the present invention provides an inline chemical induction system that comprises an air dryer system for a tractor trailer. The air dryer system helps keep the brakes free from ice and water, which can be particularly problematic in winter weather conditions. The device provides a canister that can be approximately thirty ounces in volume. The canister can connect to a ball valve, wherein the ball valve can connect to a quick release coupling. This mechanism is then connected to a T-connector having two lengths of brass or similar material piping via a glad hand connector to both the truck and the trailer, respectively.

Referring now to FIG. 1, there is shown a perspective view of the canister 102 of the air dryer system according to one embodiment of the present invention. The canister 102 may include a side wall 104 and a bottom 106 defining an upwardly opening chamber 108. The canister 102 may further include a lid 110 removably secured to the canister 102. The lid 110 is configured to be an air tight closure of the chamber 108. A ball valve 112 may be coupled to the bottom 106 of the canister 102, wherein the ball valve 112 is configured to be moveable between an open position and a closed position.

The lid 110 may include a rubber gasket seal to provide an air tight closure for the canister chamber 108. The canister may include an externally threaded lip for securing the lid 110. However, the canister could be provided without a lip, but an upper portion of the wall of the chamber 108 may be threaded to receive a lid 110. These internal threads could then mate with an externally threaded rim on the lid. Although the lid 110 is shown to be threaded onto the canister 102, the lid 110 can be connected to the canister in other manners that will allow for an air tight seal between the lid and the canister. For example, a key slot type connection can be used comprising a pin on the lid or the canister, and a bayonet slot on the other of the lid and the canister.

In a preferred embodiment, the canister may have a cylindrical body. The chamber can have a diameter of about 3" (~7.6 cm) and a depth of about 2" (~5 cm), giving the chamber a volume of about 14 in$^3$ (or about 230 cc or about 8 fluid ounces), exclusive of the volume defined by the lip. As can be appreciated, the opening to the chamber is substantially greater than the opening in the glad hand connector (which is typically about 0.5" in diameter). Preferably, the opening to the chamber is at least 2" in diameter and the volume of the canister is 30 fluid ounces. The opening to the chamber is substantially the same diameter as the chamber. As will become apparent, the size of the opening facilitates pouring of alcohol into the air dryer system.

Figure 2:
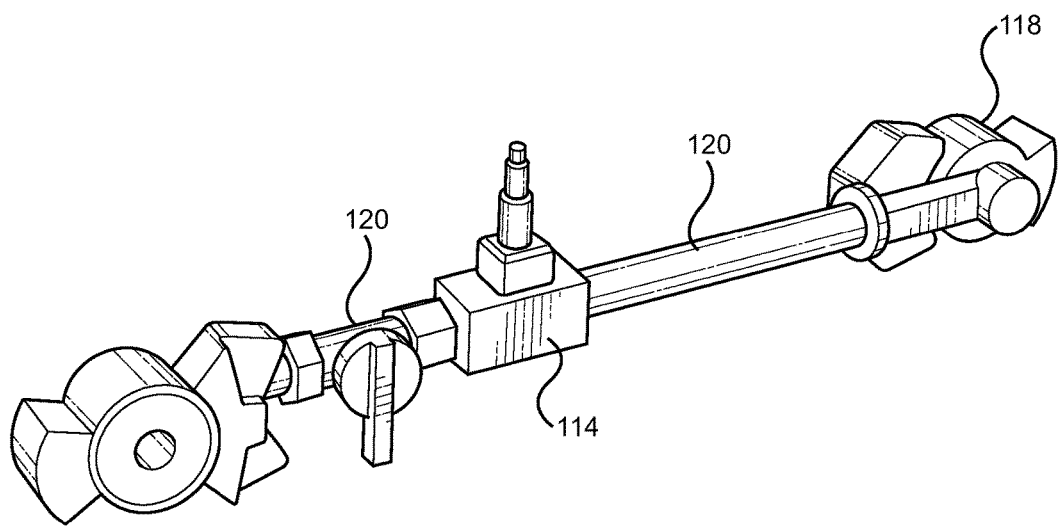
FIG. 2 shows perspective view of the t-connector according to one embodiment of the present invention.
Figure 3:
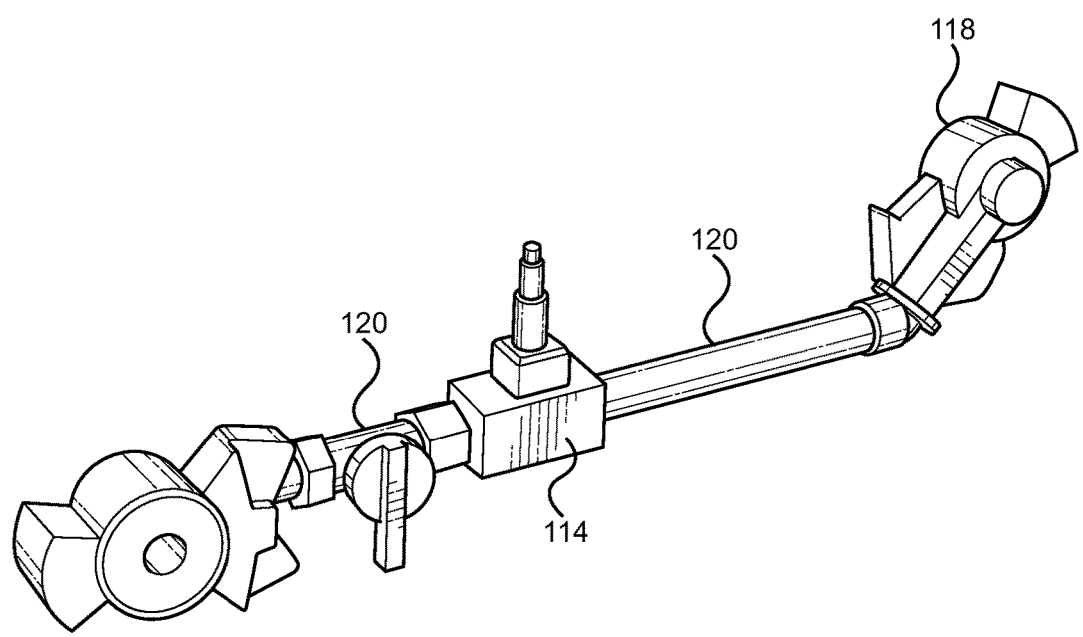
FIG. 3 shows perspective view of the t-connector according to one embodiment of the present invention.

Referring now to FIGS. 2 and 3, there are shown perspective views of the t-connector 114 according to example embodiments of the present invention. The t-connector 114 may be coupled to the canister 102 via the ball valve 112. The ball valve 112 places the t-connector 114 in fluid communication with the chamber 108. A quick release coupling 116 may be pivotally attached to the ball valve 112 to allow fluid to flow to the t-connector 114. When the quick release coupling 116 is released, a fluid is dispersed to the inline air braking system of a truck.

According to one embodiment, the canister can connect to a ball valve, wherein the ball valve can connect to a quick release coupling. This mechanism is then connected to a 6-connector, or a t-shape connector, having two lengths of brass or similar material piping extending from the body of the t-connector. The two lengths of piping are connected via a glad hand connectors to both the truck and the trailer, respectively.

The t-connector 114 further may include at least two lengths of piping 120 extending from the body of the t-connector 114. The lengths of piping 120 are coupled to the t-connector 114. The glad hand connectors 118 are located at an outward end of the two lengths of piping 120. The glad hand connectors 118 are disposed on distal ends of the two lengths of piping 120. The glad hand connectors 118 allow the air brake system to easily attach to the airline of a truck and a truck trailer. In an alternate embodiment of the invention, the piping coupled to the t-connector 114 is positioned at a forty five degree angle, as illustrated in FIG. 3. This configuration can allow different attachment points to the truck air brake inline via the glad hand connectors.

The air dryer system may further include brass pipes and fittings to removably attaching the air dryer system to a truck and a truck trailer. The air dryer system may include pipe sealant. The pipe sealant may cover the glad hand connectors, pipe fittings, valves and etc, to provide an air tight system preventing leakage or pressure drops.

Figure 4:
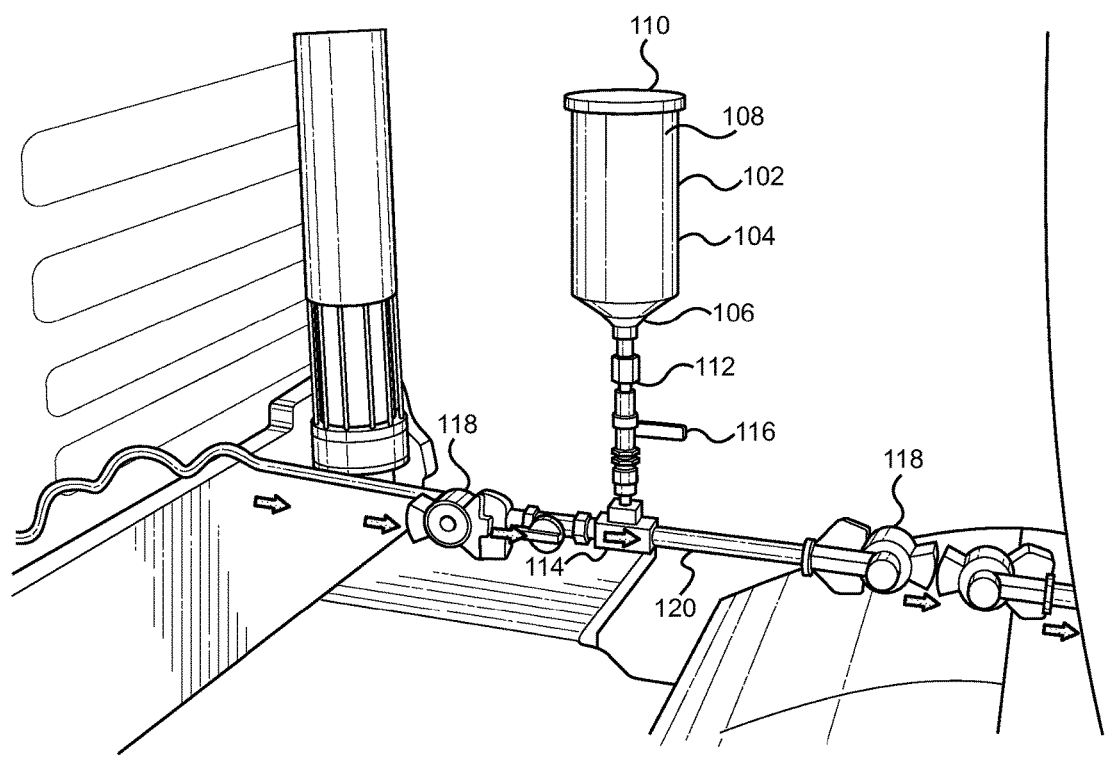
FIG. 4 shows an air dryer system coupled to a truck and truck trailer according to one embodiment of the present invention.

Referring now to FIG. 4, there is shown an air dryer system coupled to a truck and truck trailer according to one embodiment of the present invention. The air dryer system is attached to the truck and truck trailer via glad hand connectors 118. The glad hand connectors 118 connect to mating connectors disposed on the truck body and the trailer body. The glad hand connection 118 between the air dryer system and the truck facilitates fluid communication between a fluid contained in the chamber 108 of the canister 102 and the inline air braking system of the truck.

According to one embodiment of the present invention, the process of removing moisture and contaminants from the truck inline begins with connecting the air dryer system to an inline of a truck. The air dryer system includes a canister 102, a lid removably 110 secured to the canister 102, a ball valve 112 coupled to the bottom of the canister 102, a t-connector 114 coupled to the canister 102 via the ball valve 112, a quick release coupling 116 pivotally attached to the ball valve 112, and a plurality of glad hand connectors 118.

After connecting the air dryer system to the truck inline, a deicing agent or moisture removing fluid may be poured into the chamber 108 of the canister 102. The volume of the of the fluid poured into the canister 108 varies with the volume of the inline braking system being flushed. The canister facilitates introduction of a fluid agent into the air line of a tractor trailer. In a preferred embodiment, alcohol is poured in the top of the canister 108. A user may then open the ball valve 112 by applying a rotational force on the quick release coupling 116. This enables the alcohol to flow through the piping and brakes, thus clearing a vehicle's air brake system of moisture. The alcohol flows through the inline of the truck air brake system and rids the brake system of moisture and the like.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An air dryer system to keep brakes free from ice and water, comprising:
    a canister comprising a side wall and a bottom defining an upwardly opening chamber;
    a lid removably secured to the canister, the lid configured to be an air tight closure of the chamber;
    a ball valve coupled to the bottom of the canister, wherein the ball valve is configured to move between an open position and a closed position;
    a t-connector coupled to the canister via the ball valve, wherein the ball valve places the t-connector in fluid communication with the chamber;
    a quick release coupling attached to the ball valve; and
    a plurality of glad hand connectors, wherein the glad hand connectors are disposed at distal ends of the t-connector.

2. The air dryer system of claim 1, further comprising at least two lengths of piping, wherein the at least two lengths of piping are coupled to the t-connector.

3. The air dryer system of claim 2, wherein the glad hand connectors are located at an outward end of the at least two lengths of piping.

4. The air dryer system of claim 2, wherein the at least two lengths of piping coupled to the t-connector are positioned at a forty five degree angle.

5. The air dryer system of claim 1, wherein the canister has a volume of about 30 ounces.

6. The air dryer system of claim 1, wherein alcohol is poured into the top portion of the canister to flow through at least two lengths of piping.

7. The air dryer system of claim 1, further comprising brass pipes and fittings to removably attach the air dryer system to a truck and a truck trailer.

8. The air dryer system of claim 1, further comprising pipe sealant, wherein the pipe sealant seals the glad hand connectors.

* * * * *